(12) United States Patent
Mellquist et al.

(10) Patent No.: US 10,693,735 B2
(45) Date of Patent: *Jun. 23, 2020

(54) FABRIC MANAGEMENT DEVICES

(71) Applicant: Hewlett Packard Enterprise Development LP, Houston, TX (US)

(72) Inventors: Peter Erik Mellquist, Roseville, CA (US); Bryan Stiekes, Brownstown Township, MI (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/357,744

(22) Filed: Mar. 19, 2019

(65) Prior Publication Data

US 2019/0215245 A1 Jul. 11, 2019

Related U.S. Application Data

(63) Continuation of application No. 15/337,077, filed on Oct. 28, 2016, now Pat. No. 10,270,663.

(51) Int. Cl.
*H04L 12/24* (2006.01)
*H04L 12/26* (2006.01)

(52) U.S. Cl.
CPC .......... *H04L 41/12* (2013.01); *H04L 41/0816* (2013.01); *H04L 43/08* (2013.01); *H04L 41/0823* (2013.01)

(58) Field of Classification Search
CPC . H04L 41/12; H04L 41/0803; H04L 41/0813; H04L 41/0816; H04L 41/0823; H04L 41/50; H04L 43/10; H04L 43/04; H04L 43/08; H04L 43/16; H04L 49/10;
(Continued)

(56) References Cited

U.S. PATENT DOCUMENTS 7,275,103 B1  9/2007  Thrasher et al.
7,761,622 B2  7/2010  Nguyen
8,065,660 B1  11/2011  Tanner et al.
(Continued)

OTHER PUBLICATIONS

Kristophorus Hadiono, "How to Configure an IP Address on Raspberry Pi," Nov. 23, 2013, pp. 1-20, Xmodulo.

*Primary Examiner* — Peter Chen
(74) *Attorney, Agent, or Firm* — Brooks, Cameron & Huebsch, PLLC

(57) ABSTRACT

Examples include fabric management devices. Some examples include a fabric management device to manage a network fabric. The fabric management device comprises a serial interface to connect to a network device of the network fabric that provides power and data to the fabric management device, a processing resource, and a machine-readable storage medium with instructions executable by the processing resource. The machine-readable storage medium comprises instructions establish communication across the serial interface with the network device via a fabric management device driver, discover a topology of the network fabric, wherein the network fabric comprises a plurality of network devices, and monitor a set of network performance metrics of the plurality of network devices. The machine-readable storage medium further comprises instructions to dynamically configure the network fabric based on the set of network performance metrics.

18 Claims, 9 Drawing Sheets

(58) Field of Classification Search
CPC ... H04L 49/351; H04L 49/353; H04L 49/357; H04L 45/02; H04L 12/4633
See application file for complete search history.

(56) References Cited

U.S. PATENT DOCUMENTS

| | | |
|---|---|---|
| 8,995,450 B2 | 3/2015 | Connelly et al. |
| 2002/0161879 A1 | 10/2002 | Richard |
| 2006/0271677 A1 | 11/2006 | Mercier |
| 2010/0312913 A1 | 12/2010 | Wittenschlaeger |
| 2013/0198346 A1 | 8/2013 | Jubran et al. |
| 2014/0317277 A1 | 10/2014 | Panozzo et al. |
| 2016/0035183 A1 | 2/2016 | Buchholz et al. |
| 2017/0026243 A1 | 1/2017 | Berner et al. |

FABRIC MANAGEMENT DEVICES

RELATED APPLICATIONS

This application is a continuation of U.S. patent application Ser. No. 15/337,077, now issued as U.S. Pat. No. 10,270,663, filed on Oct. 28, 2016, the contents of which are incorporated herein by reference in their entirety.

DESCRIPTION OF RELATED ART

A network may involve many interconnecting network devices, such as network switches, routers, and servers, that are connected to one another through communication links. The interconnection of network devices via communication links may be referred to as a network fabric given the density and inter-woven nature of the communication links. Network fabric management allows for complex network fabrics to be reconfigured, updated, or analyzed for performance.

BRIEF DESCRIPTION OF THE DRAWINGS

The following detailed description references the drawings, wherein.

DETAILED DESCRIPTION

Figure 1:
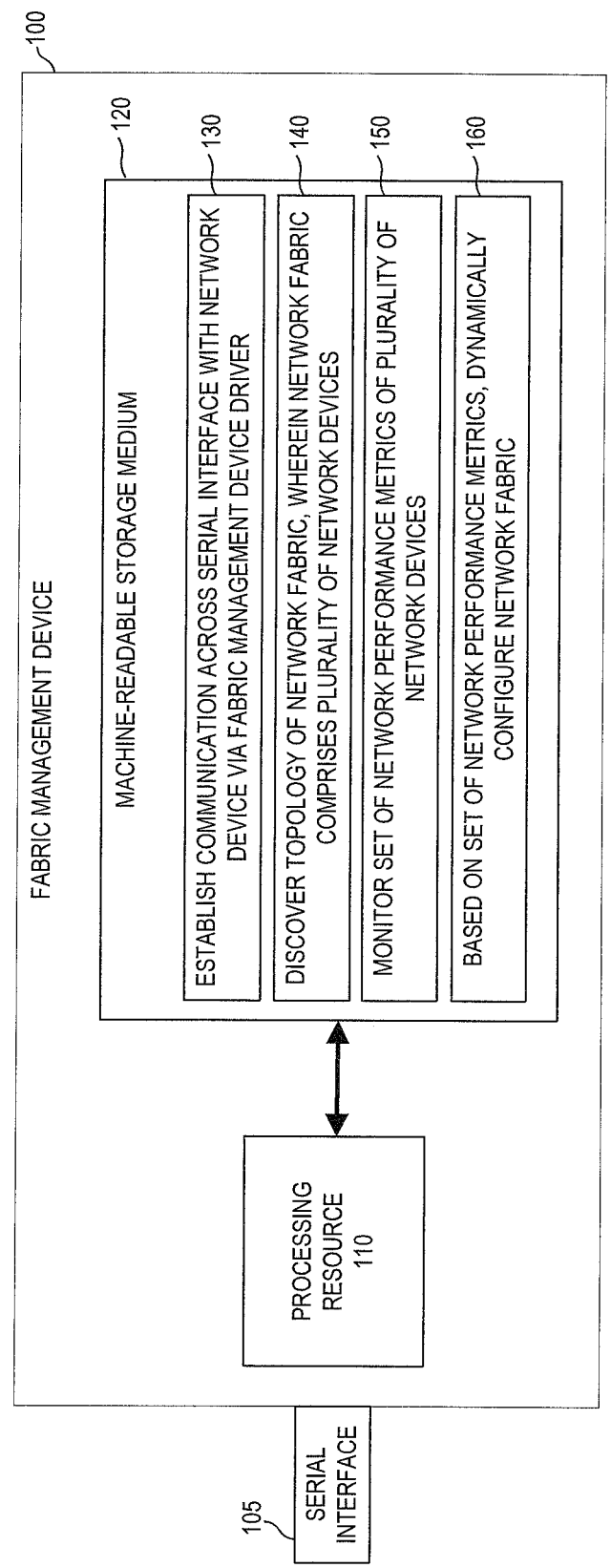
FIG. 1 is a block diagram of an example fabric management device to manage a network fabric having a serial interface, a processing resource, and a machine-readable storage medium.

A network fabric may include network devices, such as switches, routers, servers, and the like, and their connectivity. Network fabric management involves fault, configuration, accounting, performance, and security (FCAPS) management of the network fabric. In some examples, network fabric management may allow for maintenance and analysis of individual switches. In other examples, network fabric management may allow for the creation, installation, and/or maintenance of fabric-wide switch configurations.

In some examples, network fabric management functionalities may reside within a network management system that mimics or duplicates the network fabric. The network management system may involve dedicated ports, connections, and communication links at each network device, as well as other dedicated equipment that replicate the network fabric. Such approaches may be time and resource intensive. For instance, installation and maintenance of a network management system that mimics a network fabric may entail the services of experienced technicians and may involve a great deal of additional equipment, including large numbers of additional communications lines. In addition, such systems may not be easily scalable. For instance, a network fabric expansion may not only involve new network devices, but new communication lines or other equipment to support the network management system. In some examples, some network fabric management functionalities may reside within each of the network devices. Network devices, however, may have limited storage resources available to support network fabric management.

Examples described herein may improve network fabric management via a modular fabric management device that can easily interface with a network device, can easily scale with the network fabric, and may involve the use of fewer fabric management-dedicated resources within individual network devices. In some examples described herein, a fabric management device to manage a network fabric may involve a serial interface to connect to a network device of the network fabric, a processing resource, and a machine-readable storage medium. The machine-readable storage medium may include instructions to establish communication across the serial interface via a fabric management device driver, monitor a set of network performance metrics, and dynamically configure the network fabric based on the network performance metrics. In some examples, the fabric management device may further include a wireless interface to receive requests to manage the network fabric from a graphical user interface of a network system.

In some examples described herein, a fabric management device to manage a network fabric may comprise a serial interface to connect to a network device of the network fabric, wherein the serial interface provides power and data to the fabric management device. The device may also comprise a processing resource and a machine-readable storage medium encoded with instructions executable by the processing resource. The machine-readable storage medium may be encoded with instructions to establish communication across the serial interface with the network device via a fabric management device driver, discover a topology of the network fabric, wherein the network fabric comprises a plurality of network devices, and monitor a set of network performance metrics of the plurality of network devices. The machine-readable storage medium may further comprise instructions to dynamically configure the network fabric based on the set of network performance metrics. In some examples, the serial interface is a Universal Serial Bus (USB) interface or a FireWire interface.

In some such examples, establishing communication with the network device may further comprise instructions to present a fabric management device digital certificate to the network device, receive, from the network device, a network device digital certificate based on a verification of the fabric management device digital certificate, verify the network device digital certificate, and establish a secure tunnel between the fabric management device and the network device.

In further such examples, the fabric management device may comprise a wireless interface to interface with an out-of-band wireless management network and the machine-readable medium may further comprise instructions to support a network system, receive a request to manage the network fabric from a graphical user interface of the network system via the out-of-band wireless management network, and based on the request, dynamically configure the network fabric.

In other such examples, the machine-readable storage medium may further comprise instructions to statically configure the network device and based on the set of network performance metrics, determine fabric performance, detect a fabric fault, and provide application visibility.

In some examples described herein, a machine-readable storage medium encoded with instructions executable by a processing resource of a fabric management device to manage a network fabric may comprise instructions to establish communication between the fabric management device and a network device of the network fabric via a fabric management device driver, discover a topology of the network fabric, wherein the network fabric comprises a plurality of network devices, statically configure the network device, and monitor a set of network performance metrics of the plurality of network devices. Based on the set of network performance metrics, the machine-readable storage medium may further comprise instructions to dynamically configure the network fabric.

In some examples described herein, a system comprises a fabric management device driver for a network device of a network fabric and fabric management device to manage the network fabric. The fabric management device may comprise a serial interface to connect to the network device, wherein the serial interface provides power and data to the fabric management device, a processing resource, and a machine-readable storage medium encoded with instructions executable by the processing resource. The machine-readable storage medium may comprise instructions to establish a secure tunnel between the fabric management device and the network device across the serial interface and via the fabric management device driver, monitor a set of network performance metrics of a plurality of network devices, wherein the network fabric comprises a plurality of network devices, and based on the set of network performance metrics, dynamically configure the network fabric.

In some examples described herein, a method of managing a network fabric comprises the establishment of a secure tunnel between a fabric management device and a network device of a network fabric. The secure tunnel may be established via a fabric management device driver and across a serial interface through which the fabric management device connects to the network device and receives power and data. The fabric management device may discover a topology of the network fabric, wherein the network fabric comprises a plurality of network devices and may monitor a set of network performance metrics of the plurality of network devices. Based on the set of network performance metrics, the network fabric may be dynamically configured. In examples described herein, a determination, action, etc., that is said to be "based on" a given condition may be based on that condition alone or based on that condition and other condition(s).

Referring now to the drawings, FIG. 1 is a block diagram of an example fabric management device 100 to manage a network fabric. As shown, fabric management device 100 includes a serial interface 105, a processing resource 110 and a machine-readable storage medium 120 comprising (e.g., encoded with) instructions 130, 140, 150, and 160, executable by processing resource 110 to implement functionalities described herein in relation to FIG. 1. The functionalities described herein in relation to instructions 130, 140, 150, 160, and any additional instructions described herein in relation to storage medium 120, are implemented at least in part in electronic circuitry (e.g., via any combination of hardware and programming to implement functionalities, as described below).

In examples described herein, a processing resource may include, for example, one processor or multiple processors included in a single device or distributed across multiple devices. As used herein, a processor may be at least one of a central processing unit (CPU), a semiconductor-based microprocessor, a graphics processing unit (GPU), a field-programmable gate array (FPGA) to retrieve and execute instructions, other electronic circuitry suitable for the retrieval and execution instructions stored on a machine-readable storage medium, or a combination thereof.

In the examples of FIG. 1, processing resource 110 may include, for example, one processor or multiple processors included in fabric management device 100. Processing resource 110 may fetch, decode, and execute instructions stored on storage medium 120 to perform the functionalities described below in relation to instructions 130, 140, 150, and 160. In other examples, the functionalities of any of the instructions of storage medium 120 may be implemented in the form of electronic circuitry, in the form of executable instructions encoded on a machine-readable storage medium, or a combination thereof. In the example of FIG. 1, storage medium 120 may be implemented by one machine-readable storage medium, or multiple machine-readable storage media in the fabric management device.

As used herein, a machine-readable storage medium may be any electronic, magnetic, optical, or other physical storage apparatus to contain or store information such as executable instructions, data, and the like. For example, any machine-readable storage medium described herein may be any of Random Access Memory (RAM), volatile memory, non-volatile memory, flash memory, a storage drive (e.g., a hard drive), a solid state drive, any type of storage disc suitable for use within a fabric management device (e.g., a mini compact disc, a mini DVD, etc.), and the like, or a combination thereof. Further, any machine-readable storage medium described herein may be non-transitory. In examples described herein, a machine-readable storage medium or media may be part of an article (or article of manufacture). An article or article of manufacture may refer to any manufactured single component or multiple components.

As used herein, a fabric management device may be a small form factor device to manage a network fabric. The fabric management device may have a processing resource and a machine-readable storage medium to implement the network fabric management functionalities described in the examples herein. The fabric management device may perform FCAPS management functionalities of the network fabric. A network fabric, as used herein, describes network devices within a network and their connectivity.

In the examples herein, a network device is a computing device that provides networking functionality. In some examples, a network device is a network switch, a router, an access point, an edge device, a server, or the like. A network switch may be a standalone switch, a switch embedded on a compute device network interface card, or a switch module installed in a module compute enclosure. In some examples, multiple network switches may reside on a device with each switch comprising a programming instance of a switch running on the device.

In the example of FIG. 1, fabric management device 100 includes a serial interface 105 to connect to a network device of a network fabric. A serial interface, as used herein, is a communication interface in which data is transmitted as a series of bits on a wire. Serial interface 105 may communicate power from the network device to fabric management device 100 to provide power to the fabric management device. Data may also be communicated between the network device and the fabric management device via serial interface 105. In some examples, serial interface 105 may be a standard serial interface such as a Universal Serial Bus (USB) interface or a FireWire interface. In one example, the serial interface 105 may be a male USB connector that interfaces with and connects to a female USB connector of the network device. Serial interface 105 of fabric management device 100 may be connected to any network device in a network fabric. For instance, in an example in which serial interface 105 is a USB connector, it may be plugged into a USB connector on a network switch.

As depicted in FIG. 1, machine-readable medium 120 includes instructions 130, 140, 150 and 160. Once serial interface 105 has been connected to a network device of a network fabric, instructions 130 establish communication across serial interface 105 with the network device via a fabric management device driver. A fabric management device driver, as used in the examples herein, is a set of instructions that may allow for communication between a fabric management device and a network device. In some examples, the set of instructions are encoded on a machine-readable medium within the network device and are executable by a processing resource within the network device. In such examples, the fabric management device driver may be loaded and installed on the network device prior to or at the time of execution of instructions 130.

In some examples, instructions 130 may establish secure communication in which the fabric management device 100 and the network device authenticate and/or authorize one another to communicate via a handshaking process. The communication may also be encrypted either because the data itself is encrypted or because the communication channel or tunnel between fabric management device 100 and the network device is encrypted. In other examples, communication may not be encrypted and/or may be established without authorization or authentication upon serial interface 105 being connected to the network device.

Instructions 140 discover a topology of the network fabric. The network fabric may include a plurality of network devices. A topology of a network fabric, as used herein, is the arrangement of the network fabric, including the network devices and the connecting communication links. Discovering a topology of the network fabric may include discovering the local area network (LAN) to which the network device belongs, discovering the network devices that belong to the LAN, and/or discovering the interconnectivity between the network devices. In some examples, instructions 140 may automatically discover the topology of the network fabric via serial interface 105. Instructions 140 may use any appropriate topology discovery mechanism, such as hello mechanisms, various routing protocols, connectivity management protocols, and the like. These discovery mechanisms are performed at the control plane or control layer. In one example, instructions 140 may direct the network switch to send and receive topology discovery packets to discover the topology of the network fabric.

Instructions 150 monitor a set of network performance metrics of the plurality of network devices of the network fabric. For instance, instructions 150 may gather network performance metrics from the plurality of network devices that relate to the type of traffic, frequency of the traffic, traffic faults, connectivity errors, traffic management, traffic and network device speed, bandwidth, and the like. Monitoring the set of network performance metrics may include gathering or tracking a single network performance metric or multiple network performance metrics, as appropriate. In some examples, the information collected from monitoring the set of network performances is stored within fabric management device 100. In other examples, the information may be stored in any suitable data repository with which fabric management device 100 communicates.

Based (at least in part) on the monitored set of network performance metrics, instructions 160 dynamically configure the network fabric. For instance, in response to a set of network performance metrics that indicate a slowdown in traffic, instructions 160 may alter pathways between network devices such that certain pathways are favored over others. In response to faulty network devices, instructions 160 may seamlessly remove or replace network devices. In other instances, in response to a set of network performance metrics that indicate an overburdened fabric, instructions 160 may seamlessly scale the fabric via the addition of new network devices. In some examples, fabric management device 100 may issue a call to the network device that provisions or reconfigures the network device itself. In other examples, fabric management device may issue a call to the network device that propagates through the network fabric via a clustering mechanism to reconfigure pathways between the network devices or to add, remove, or reconfigure other network devices.

In some examples, a fabric management device may consolidate some distributed management and control functionalities into a small form factor device that can be connected via a serial interface to any network device of a network fabric to provide management of the network fabric. In some such examples, the serial interface is a standardized serial interface that easily interfaces with existing connectors on a network device. The fabric management device may communicate with a fabric management device driver on a network device to manage the network fabric, allowing for the removal of certain management and control functionalities on the network device itself.

Instructions 130, 140, 150, and 160 may be part of an installation package that, when installed on fabric management device 100, may be executed by processing resource 110 to implement the functionalities described above. In such examples, the instructions may be stored on a portable medium, such as a CD, DVD, or flash drive, or a memory maintained by a server from which the installation package can be downloaded and installed on storage medium 120 in fabric management device 100. In other examples, instructions 130, 140, 150, and 160 may be part of an application, applications, or component(s) already installed on fabric management device 100 including processing resource 110. In such examples, the storage medium 120 may include any suitable type of memory, including a hard drive, solid state drive, or the like. In some examples, functionalities described herein in relation to FIG. 1 may be provided in combination with functionalities described herein in relation to any of FIGS. 2-11.

Figure 2:
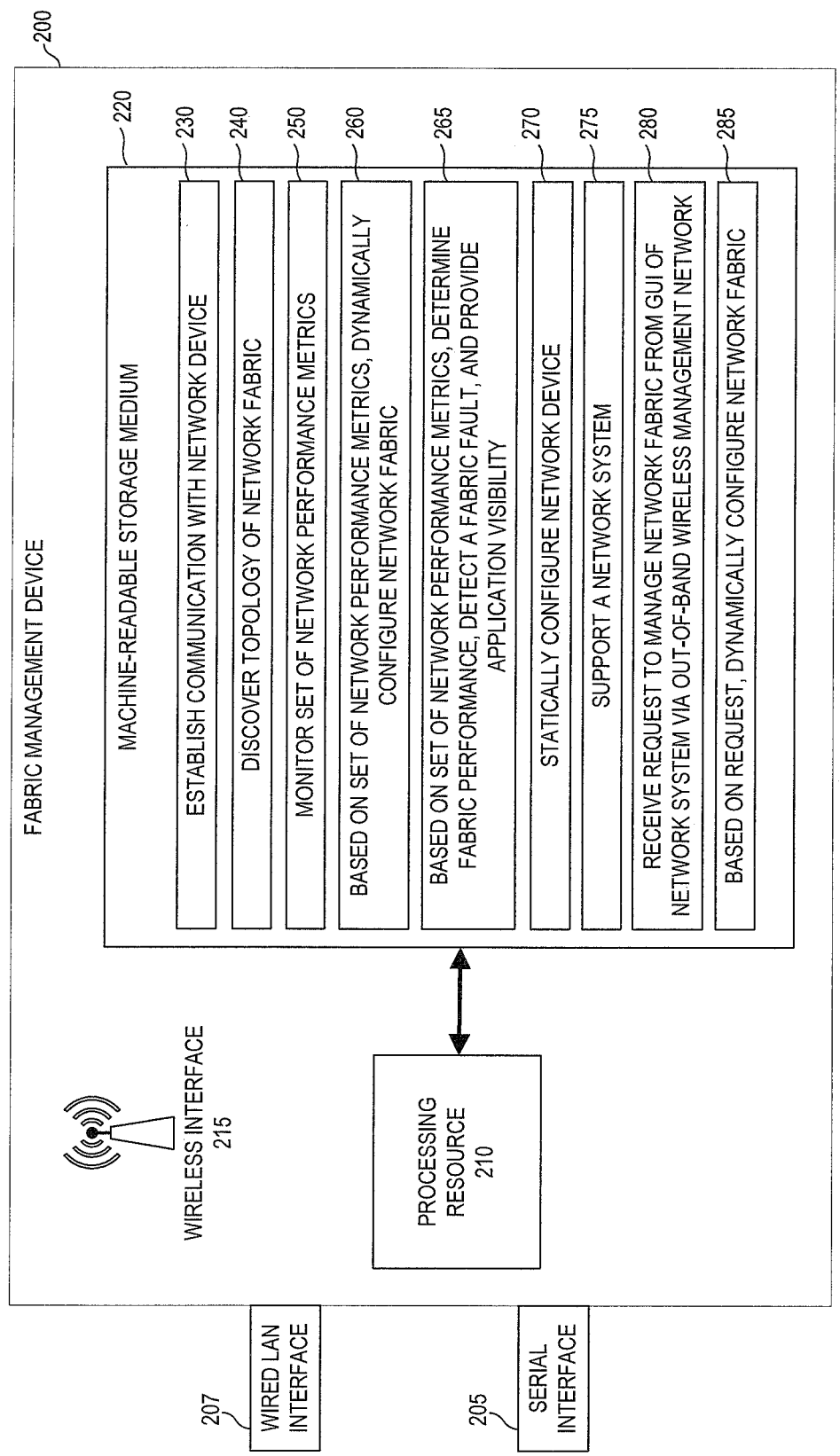
FIG. 2 is a block diagram of an example fabric management device to manage a network fabric having a serial interface, a wireless interface, a wired local area network interface, a processing resource, and a machine-readable storage medium.

Further examples are described with reference to FIG. 2. FIG. 2 is a block diagram of an example fabric management device 200 to manage a network fabric. As shown, fabric management device 200 includes, among other things, a processing resource 210 and a machine-readable storage medium 220 comprising (e.g., encoded with) instructions 230, 240, 250, 260, 265, 270, 275, 280, and 285 executable by processing resource 210 to implement functionalities described herein in relation to FIG. 2. The functionalities described herein in relation to instructions 230, 240, 250, 260, 265, 270, 275, 280, 285, and any additional instructions described herein in relation to storage medium 220, are implemented at least in part in electronic circuitry (e.g., via any combination of hardware and programming to implement functionalities, as described below).

Fabric management device 200 may further include a serial interface 205, a wired LAN interface 207, and a wireless interface 215. Although the example of FIG. 2 depicts fabric management device 200 as including each of these interfaces, in some examples, fabric management device 200 may include serial interface 205 and either of wired LAN interface 207 or wireless interface 215, as appropriate. Likewise, while the example of FIG. 2 depicts each of instructions 230, 240, 250, 260, 265, 270, 275, 280, 285, fabric management device 200 may include various combinations of these instructions, as appropriate.

Serial interface 205 of fabric management device 200 connects to a network device of a network fabric to communicate power from the network device to fabric management device 200 and to communicate data between the network device and the fabric management device, as described above in relation to serial interface 105 of FIG. 1. In some examples, serial interface 205 may be a standard serial interface such as a Universal Serial Bus (USB) interface or a FireWire interface.

Fabric management device 200 may also include wireless interface 215 to interface wirelessly with other network management and control applications and devices. As used in the examples herein, wireless interface refers to an interface that allows connection to a wireless network. For instance, wireless interface 215 may be a combination of hardware and programming that provides fabric management device 200 with wireless connectivity to a wireless LAN. In one example, wireless interface 215 may provide connectivity to an out-of-band (OOB) wireless management network. An OOB wireless management network, as used herein, refers to a dedicated wireless frequency band for managing the network. The OOB wireless management network may be public or private. Wireless interface 215 may include an internal or external antenna to connect to a wireless network. In some examples, fabric management device 200 may act as a wireless access point.

As shown in FIG. 2, fabric management device 200 may additionally include wired LAN interface 207 to interface with a wired management network. As used in the examples herein, wired LAN interface refers to an interface that allows connection to a wired local area network. For instance, wired LAN interface 207 may be a combination of hardware and programming that provides fabric management device 200 with wired connectivity to the LAN. In one example, wired LAN interface 207 may provide connectivity to an out-of-band (OOB) wired management network. An OOB wired management network, as used herein, refers to a dedicated wired frequency band or channel for managing the network. The OOB wired management network may be public or private. Wired LAN interface 207 may include an Ethernet connector in some examples.

As depicted in FIG. 2, fabric management device 200 also includes machine-readable medium 220 having instructions 230, 240, 250, 260, 265, 270, 275, 280, and 285. Once serial interface 205 has been connected to a network device of a network fabric, instructions 230 establish communication across serial interface 205 with the network device via a fabric management device driver, as described above in relation to instructions 130 of FIG. 1. In a network fabric having multiple network devices, each network device may have installed on it a fabric management device driver to support and communicate with fabric management device 200. The fabric management device driver facilitates communication between fabric management device 200 and allows fabric management device 200 to configure the fabric network via the network device. In some examples, communication may be established via a handshaking procedure or an exchange of digital certificates involving verification through a mutually trusted Certificate Authority. In one example, instructions 230 may further comprise instructions 231, 232, 233, and 234, as depicted in FIG. 3.

Figure 3:
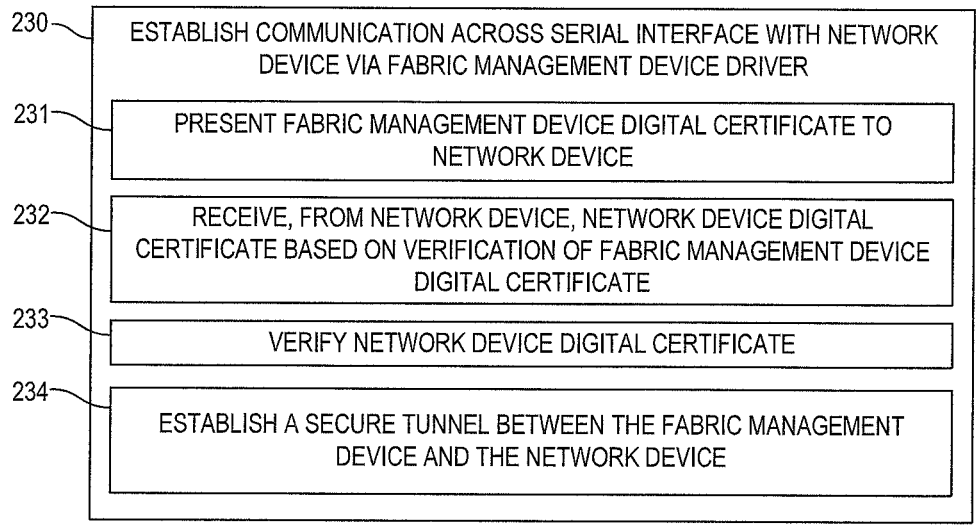
FIGS. 3-5 are block diagrams of example instructions encoded on the machine-readable storage medium and executable by the processing resource.

Referring to FIG. 3, instructions 231 present a fabric management device digital certificate by fabric management device 200 to the network device. The fabric management device digital certificate may be an X.509 digital certificate or other type of public key infrastructure certificate. In some examples, the fabric management device digital certificate may include role based access control information, attribute based access control information, and/or other user or administrator information. Upon receiving the fabric management device digital certificate, the network device may verify the certificate. In some instances, the network device may verify the certificate through a mutually trusted Certificate Authority that authorizes and authenticates fabric management device 200 based on the information within the fabric management device digital certificate. Based (at least in part) on having verified the fabric management device digital certificate, the network device may send a network device digital certificate to fabric management device 200. Instructions 232 receive, from the network device, the network device digital certificate at fabric management device 200 based (at least in part) on the verification of the fabric management device digital certificate.

Instructions 233 of FIG. 3 verify the network device digital certificate. Like the fabric management device digital certificate, the network device digital certificate may also include various types of information sufficient to authorize and authenticate the network device. In some examples, fabric management device 200 may verify the network device digital certificate through a mutually trusted Certificate Authority. Based (at least in part) on the verification by fabric management device 100, instructions 234 may establish a secure tunnel between fabric management device 200 and the network device. As used in the examples herein, a secure tunnel allows communication between an authenticated and authorized fabric management device and network device via a tunneling protocol. In some examples, the tunnel itself and/or the data carried by the tunnel may be encrypted. In other examples, encryption may not be used. The exchange and verification of digital certificates ensures that only an authorized and authenticated fabric management device may access the network, inhibiting attacks on the network and/or unauthorized changes to the network.

Referring again to FIG. 2, instructions 240 discover a topology of the network fabric, as described above in relation to instructions 140 of FIG. 1. In some examples in which fabric management device includes wireless interface 215, fabric management device may wirelessly discover the topology of the network fabric via a network application or software defined network controller with knowledge of the network fabric. In other examples in which fabric management device includes wired LAN interface 207, fabric management device may discover the topology of the network fabric via the OOB wired management network from a network application or software defined network controller with knowledge of the network fabric.

Figure 4:
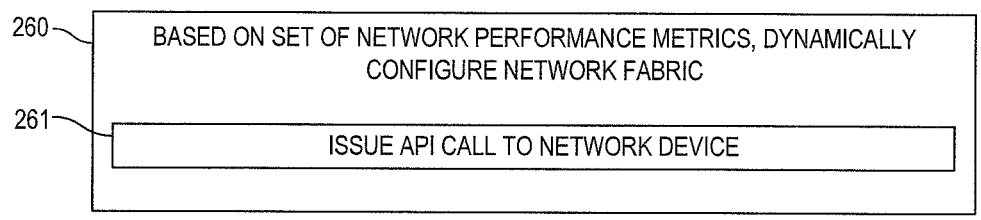
Figure 5:
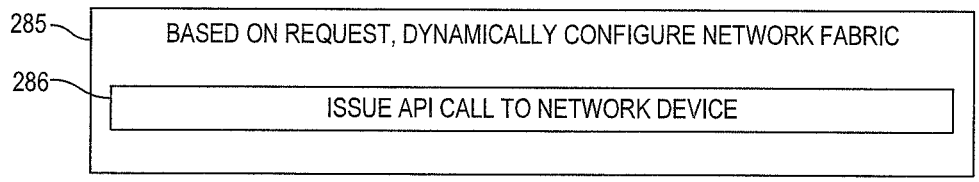

Instructions 250 monitor a set of network performance metrics of the plurality of network devices of the network fabric, as described above in relation to instructions 150 of FIG. 1. Based (at least in part) on the monitored set of network performance metrics, instructions 260 dynamically configure the network fabric, as described above in relation to instructions 160 of FIG. 1. In some examples, instructions 260 may further include instructions 261, as depicted in FIG. 4. Referring to FIG. 4, instructions 261 may dynamically configure the network fabric by generating and issuing an application program interface (API) call to the network device. The API call may invoke a particular set of routines, protocols, or tools that reconfigure links between the network devices, deactivate a network device of the plurality of network devices of the network fabric, provision a network device, and the like. Example API calls may include (but are not limited to) SNMP, REST, OVSDB, NetCONF, RedFish, CLI, TR-69, and the like. In such examples, API calls issued by fabric management device 200 may effect changes at the network device that propagate through the network fabric via any suitable clustering mechanism or protocol.

Returning to FIG. 2, based (at least in part) on the monitored set of network performance metrics, instructions 265 may determine fabric performance, detect a fabric fault, and provide application visibility. In some examples, analytics may be performed on the information from the monitored set of network performance metrics to determine fabric performance and/or optimize fabric performance. As an example, analytics may indicate that a particular segment of the network fabric is more heavily trafficked or acts as a bottleneck within the network fabric. Based (at least in part) on this determination, fabric management device 200 may dynamically configure the network fabric to optimize performance.

Instructions 265 may also detect a fabric fault, such as a failing network device or a faulty communication link, based (at least in part) on the monitored set of network performance metrics. Instructions 265 also provide application visibility with respect to certain network applications. For instance, monitoring a set of network performance metrics may involve monitoring or tracking certain types of traffic through the network. The network traffic may provide information as to the network applications from which it is generated. Monitoring and organizing such information by network application may provide traffic flow information, response time, latency, and other network application-specific information. In some examples, based (at least in part) on such information, fabric management device 200 may dynamically choose different network paths or scale the network fabric.

Instructions 270 of FIG. 2 may also allow fabric management device 200 to statically configure the network device via the fabric management device driver. For instance, fabric management device 200 may perform setup, initial security configuration, and installation configuration for network devices. In some examples, fabric management device 200 may perform static configuration via API calls issued to the network device.

Fabric management device 200 may be network system-specific in some examples. A network system, as used herein, refers to a cloud and orchestration system or container-based system supported by a network fabric. In some examples, the network fabric may be designed to support the specific network system. Likewise, fabric management device 200 may be designed to support one or multiple specific network systems. For instance, fabric management device 200 may host drivers associated with a specific network system to integrate the network system with the network fabric. In some such examples, a fabric management device 200 that is designed to support a specific network system may allow for the removal of network system-specific functionalities from the network devices of a network fabric. As an example, network devices within the network fabric may not need to host drivers associated with specific network systems for the network fabric to support those network systems. Accordingly, a network fabric with network system agnostic network devices may communicate with fabric management device 200 to support the specific network system. Instructions 275 may include network system-specific instructions to allow fabric management device 200 to communicate with and support the network system.

In some examples, network systems include a graphical user interface (GUI) that allows a user, via the network system, to set network policies, make changes to network applications, and other like changes that may affect the network fabric. In some such examples, instructions 280 may receive a request at fabric management device 200 from the GUI of the network system to manage the network fabric. The request may be received via an OOB wireless management network. In other examples, the request may be received via an OOB wired management network. Based (at least in part) on the request, instructions 285 may dynamically configure the network fabric. In some examples, instructions 285 may include instructions 286 of FIG. 5. Instructions 286 may dynamically configure the network fabric by generating and issuing an API call to the network device, as described above in relation to instructions 261 of FIG. 2.

In some examples, the fabric management device may be used as a device to easily troubleshoot a network fabric. For instance, fabric management device 200 may be connected to a network device of the network fabric to generate and issue a set of API calls to the network device to determine if a network device and/or a pathway of the network fabric is faulty.

In other examples, fabric management device 200 may be used to integrate a network fabric with an additional network system. For instance, a network fabric that supports a cloud and orchestration system may readily be customized to support a container-based system by using one or multiple fabric management device(s) that support both the cloud and orchestration system and the container-based system. In such an example, network devices within the network fabric need not be updated to integrate with the container-based system as the fabric management device(s) may simply host any drivers associated with the new container-based system.

Instructions 230, 240, 250, 260, 265, 270, 275, 280, 285, and any additional instructions described herein (e.g., instructions 231, 232, 233, and 234 of FIG. 3, 261 of FIG. 4, and 286 of FIG. 5) of FIG. 2 may be part of an installation package that, when installed on fabric management device 200, may be executed by processing resource 210 to implement the functionalities described above. In such examples, the instructions may be stored on a portable medium, such as a CD, DVD, or flash drive, or a memory maintained by a server from which the installation package can be downloaded and installed on storage medium 220 in fabric management device 100. In other examples, instructions 230, 240, 250, 260, 265, 270, 275, 280, 285, and any additional instructions described herein (e.g., instructions 231, 232, 233, and 234 of FIG. 3, 261 of FIG. 4, and 286 of FIG. 5) may be part of an application, applications, or component(s) already installed on fabric management device 200 including processing resource 210. In such examples, the storage medium 220 may include any suitable type of memory, including a hard drive, solid state drive, or the like. In some examples, functionalities described herein in relation to FIGS. 2-5 may be provided in combination with functionalities described herein in relation to any of FIGS. 1 and 6-11.

Figure 6:
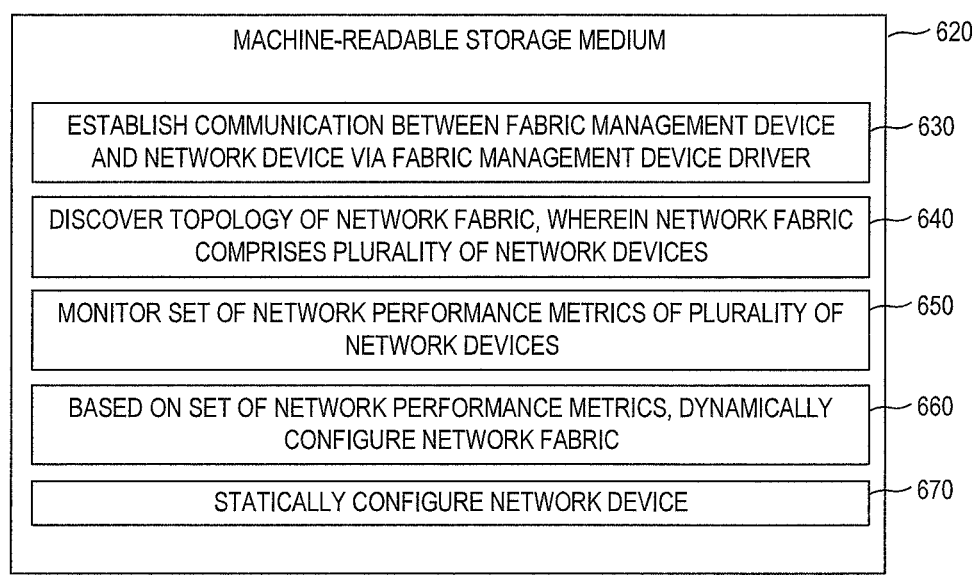
FIG. 6 is a block diagram of a machine-readable storage medium having example instructions to establish communication between a fabric management device, monitor a set of network performance metrics, and based on the network performance metrics, dynamically configure the network fabric.
Figure 7:
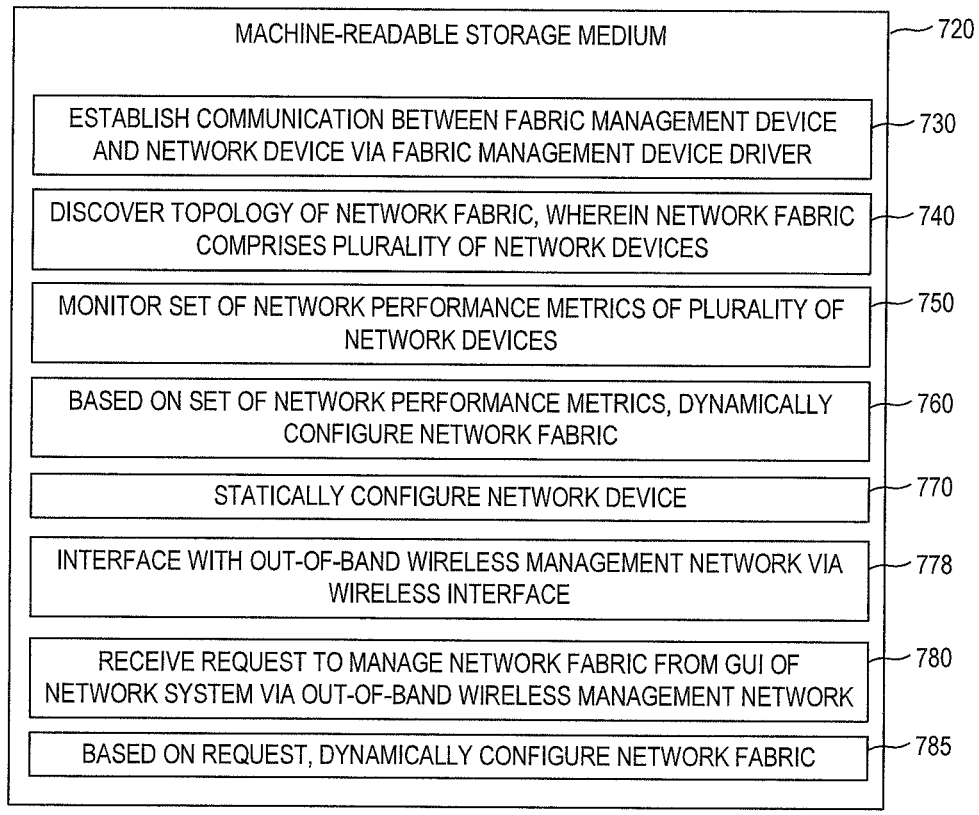
FIG. 7 is a block diagram of a machine-readable storage medium having example instructions to interface with an out-of-band wireless management network, receive a request to manage the network fabric across the out-of-band wireless management network, and based on the request, dynamically configure the network fabric.

Further examples are described herein in relation to FIGS. 6 and 7. FIG. 6 is a block diagram of an example machine-readable storage medium 620 encoded with instructions 630, 640, 650, 660, and 670 executable by a processing resource of a fabric management device to implement functionalities described herein in relation to FIG. 6. The functionalities described herein in relation to instructions 630, 640, 650, 660, 670, and any additional instructions described herein in relation to storage medium 620 are implemented at least in part in electronic circuitry (e.g., via any combination of hardware and programming to implement functionalities, as described below).

Machine-readable storage medium 620, as described above, may be any electronic, magnetic, optical, or other physical storage apparatus to contain or store information such as executable instructions, data, and the like. In some examples, storage medium 620 may be a portable medium, such as a CD, DVD, or flash drive, or a memory maintained by a server.

Instructions 630 establish communication between the fabric management device and a network device of the network fabric via a fabric management device driver, as described above in relation to instructions 230 of FIG. 2. Instructions 640 discover a topology of the network fabric, wherein the network fabric comprises a plurality of network devices, as described above in relation to instructions 240 of FIG. 2. Instructions 650 monitor a set of network performance metrics of the plurality of network devices, as described above in relation to instructions 250 of FIG. 2. Based (at least in part) on the set of network performance metrics, instructions 660 dynamically configure the network fabric, as described above in relation to instructions 260 of FIG. 2. Instructions 670 may statically configure the network device, as described above in relation to instructions 270 of FIG. 2.

Instructions 630, 640, 650, 660, and 670 may be part of an installation package that, when installed, may be executed by a processing resource of a fabric management device to implement the functionalities described above. In such examples, storage medium 620 may be a portable medium, such as a CD, DVD, or flash drive, or a memory maintained by a server from which the installation package can be downloaded and installed. In other examples, instructions 630, 640, 650, 660, and 670 may be part of an application, applications, or component(s) already installed on a fabric management device. In such examples, the storage medium 620 may include any suitable type of memory such as a hard drive, solid state drive, or the like. In some examples, functionalities described herein in relation to FIG. 6 may be provided in combination with functionalities described herein in relation to any of FIGS. 1-5 and 7-11.

FIG. 7 is a block diagram of an example machine-readable storage medium 720 encoded with instructions 730, 740, 750, 760, 770, 778, 780, and 785 executable by a processing resource of a fabric management device to implement functionalities described herein in relation to FIG. 7. The functionalities described herein in relation to instructions 730, 740, 750, 760, 770, 778, 780, 785, and any additional instructions described herein in relation to storage medium 720 are implemented at least in part in electronic circuitry (e.g., via any combination of hardware and programming to implement functionalities, as described below).

Machine-readable storage medium 720, as described above, may be any electronic, magnetic, optical, or other physical storage apparatus to contain or store information such as executable instructions, data, and the like. In some examples, storage medium 720 may be a portable medium, such as a CD, DVD, or flash drive, or a memory maintained by a server.

As described above in relation to FIG. 2, instructions 730, 740, 750, 760, and 770 perform functionalities similar to those described in relation to instructions 230, 240, 250, 260, and 270, respectively. Instructions 778 interface with an OOB wireless management network via a wireless interface, as described above in relation to wireless interface 207 of FIG. 2. Interfacing with an OOB wireless management network may involve discovering the OOB wireless management network and establishing communication with the OOB wireless management network.

Instructions 780 receive a request to manage the network fabric from a graphical user interface of a network system via the out-of-band wireless management network, as described above in relation to instructions 280 of FIG. 2. Based (at least in part) on the request, instructions 785 dynamically configure the network fabric, as described above in relation to instructions 285 of FIG. 2.

Instructions 730, 740, 750, 760, 770, 778, 780, 785 may be part of an installation package that, when installed, may be executed by a processing resource of a fabric management device to implement the functionalities described above. In such examples, storage medium 720 may be a portable medium, such as a CD, DVD, or flash drive, or a memory maintained by a server from which the installation package can be downloaded and installed. In other examples, instructions 730, 740, 750, 760, 770, 778, 780, 785 may be part of an application, applications, or component(s) already installed on a fabric management device. In such examples, the storage medium 720 may include any suitable type of memory such as a hard drive, solid state drive, or the like. In some examples, functionalities described herein in relation to FIG. 7 may be provided in combination with functionalities described herein in relation to any of FIGS. 1-6 and 8-11.

Figure 8:
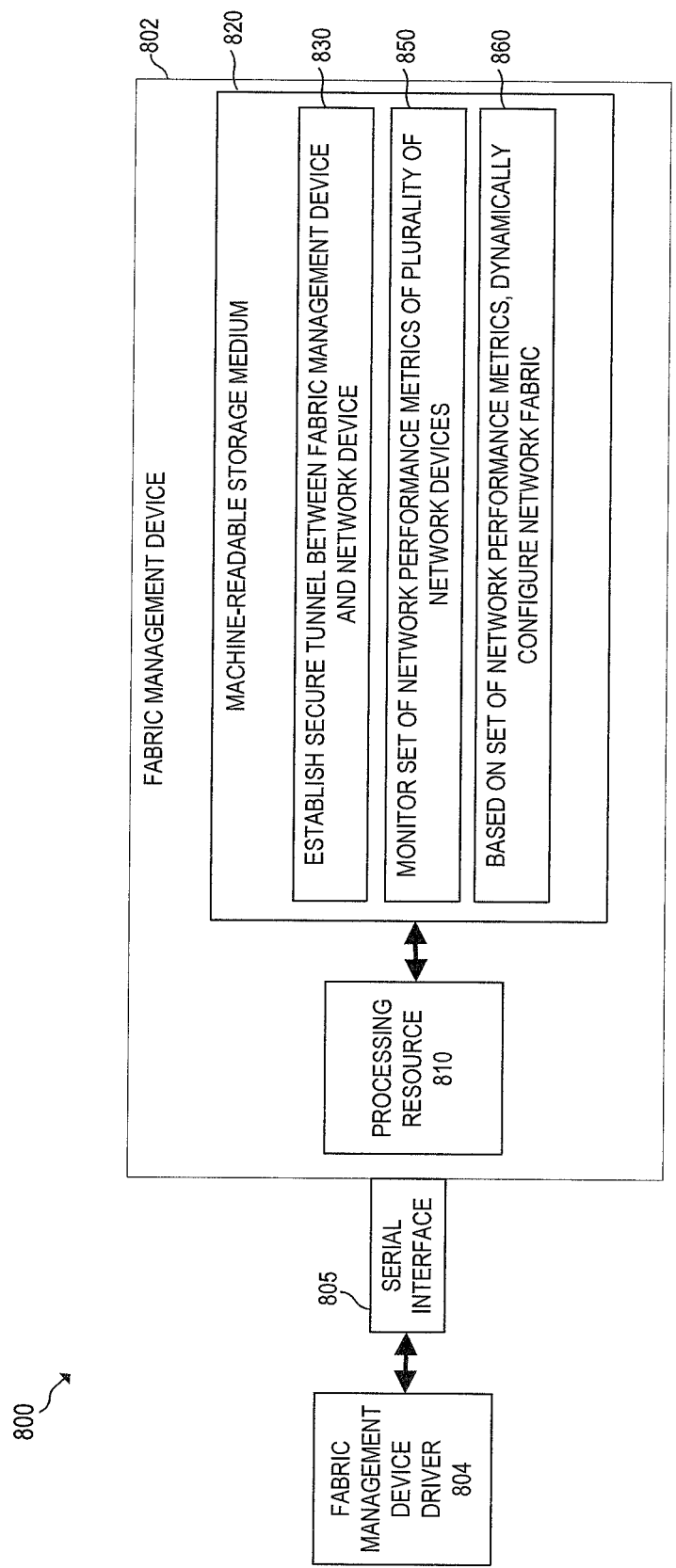
FIG. 8 is a block diagram of an example system comprising a fabric management device driver and a fabric management device.
Figure 9:
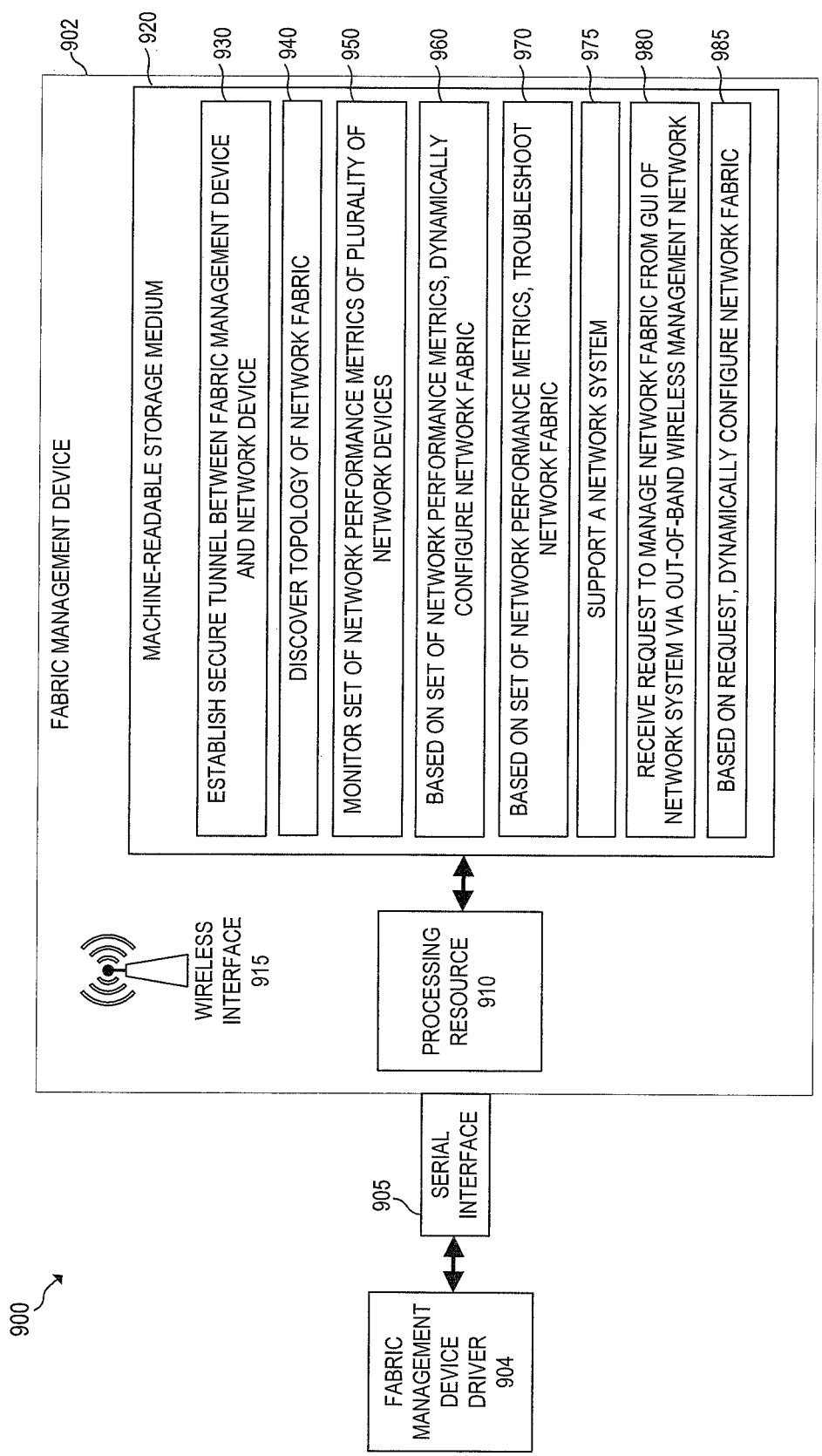
FIG. 9 is a block diagram of an example system comprising a fabric management device driver and a fabric management device that comprises a wireless interface to interface with an out-of-band wireless management network.

Additional examples are described herein in relation to FIGS. 8 and 9. FIG. 8 is a block diagram of an example system 800 comprising a fabric management device driver 804 for a network device of a network fabric and a fabric management device 802 to manage the network fabric. Fabric management device 802 includes a serial interface 805, a processing resource 810 and a machine-readable storage medium 820 comprising (e.g., encoded with) instructions 830, 850, and 860, executable by processing resource 810 to implement functionalities described herein in relation to FIG. 8. The functionalities described herein in relation to instructions 830, 850, 860, and any additional instructions described herein in relation to storage medium 820, are implemented at least in part in electronic circuitry (e.g., via any combination of hardware and programming to implement functionalities, as described below).

Fabric management device 802 includes a serial interface 805, as described above in relation to serial interface 205 of FIG. 2. Serial interface 805 provides power and data to fabric management device 802. As also described above, fabric management device driver 804 is a set of instructions that may allow for communication between a fabric management device and a network device. In some examples, the set of instructions are encoded on a machine-readable medium within the network device and are executable by a processing resource within the network device. In such examples, the fabric management device driver may be loaded and installed on the network device prior to or at the time of execution of instructions 830.

Instructions 830 may establish a secure tunnel between fabric management device 802 and the network device via fabric management device driver 804, as described above in relation to instructions 230 of FIG. 2. In some examples, fabric management device 802 may use a digital certificate process such as that described in relation to instructions 231, 232, 233, and 234 of FIG. 2 to establish the secure tunnel. In other examples, fabric management device may use another handshaking process to authenticate and authorize the network device and establish the secure tunnel. In some examples, the tunnel itself and/or the data carried by the tunnel may be encrypted. In other examples, encryption may not be used.

Instructions 850 monitor a set of network performance metrics of a plurality of network devices, wherein the network fabric comprises a plurality of network devices, as described above in relation to instructions 250 of FIG. 2. Based (at least in part) on the set of network performance metrics, instructions 860 dynamically configure the network fabric, as described above in relation to instructions 260 of FIG. 2.

Instructions 830, 850, and 860 may be part of an installation package that, when installed on fabric management device 802, may be executed by processing resource 810 to implement the functionalities described above. In such examples, the instructions may be stored on a portable medium, such as a CD, DVD, or flash drive, or a memory maintained by a server from which the installation package can be downloaded and installed on storage medium 820 in fabric management device 802. In other examples, instructions 830, 850, and 860 may be part of an application, applications, or component(s) already installed on fabric management device 802 including processing resource 810. In such examples, the storage medium 820 may include any suitable type of memory, including a hard drive, solid state drive, or the like. In some examples, functionalities described herein in relation to FIG. 8 may be provided in combination with functionalities described herein in relation to any of FIGS. 1-7 and 9-11.

FIG. 9 is a block diagram of an example system 900 comprising a fabric management device driver 904 for a network device of a network fabric and a fabric management device 902 to manage the network fabric. Fabric management device 902 includes a serial interface 905, a wireless interface 915, a processing resource 910 and a machine-readable storage medium 920 comprising (e.g., encoded with) instructions 930, 940, 950, 960, 970, 975, 980, and 985 executable by processing resource 910 to implement functionalities described herein in relation to FIG. 9. The functionalities described herein in relation to instructions 930, 940, 950, 960, 970, 975, 980, 985, and any additional instructions described herein in relation to storage medium 920, are implemented at least in part in electronic circuitry (e.g., via any combination of hardware and programming to implement functionalities, as described below).

Fabric management device 902 includes a serial interface 905 and a wireless interface 915, as described above in relation to serial interface 205 and wireless interface 215 of FIG. 2, respectively. Serial interface 905 provides power and data to fabric management device 902. As also described above, fabric management device driver 904 is a set of instructions that may allow for communication between a fabric management device and a network device. In some examples, the set of instructions are encoded on a machine-readable medium within the network device and are executable by a processing resource within the network device. In such examples, the fabric management device driver may be loaded and installed on the network device prior to or at the time of execution of instructions 930.

Instructions 930 may establish a secure tunnel between fabric management device 902 and the network device via fabric management device driver 904, as described above in relation to instructions 930 of FIG. 2. In some examples, fabric management device 902 may use a digital certificate process such as that described in relation to instructions 231, 232, 233, and 234 of FIG. 2 to establish the secure tunnel. In other examples, fabric management device 902 may use another handshaking process to authenticate and authorize the network device and establish the secure tunnel. In some examples, the tunnel itself and/or the data carried by the tunnel may be encrypted. In other examples, encryption may not be used.

Instructions 940 discover a topology of the network fabric, as described above in relation to instructions 240 of FIG. 2. Instructions 950 monitor a set of network performance metrics of a plurality of network devices, wherein the network fabric comprises a plurality of network devices, as described above in relation to instructions 250 of FIG. 2. Based (at least in part) on the set of network performance metrics, instructions 960 dynamically configure the network fabric, as described above in relation to instructions 260 of FIG. 2.

Based (at least in part) on the set of network performance metrics, instructions 970 may troubleshoot the network fabric. Troubleshooting the network fabric may involve analyzing the monitored network performance metrics to determine faulty network devices and/or communication links. In some examples, troubleshooting the network fabric may further involve generating and issuing a set of API calls to the network device to determine if a network device and/or a pathway of the network fabric is faulty.

Instructions 975 may allow fabric management device 902 to support a network system, as described above in relation to instructions 275 of FIG. 2. Instructions 980 may receive a request from the network system via the out-of-band wireless management network, as described above in relation to instructions 280 of FIG. 2. In some examples, instructions 980 may receive the request from a GUI of the network system. In other examples, instructions 980 may receive the request from another process of the network system. Based (at least in part) on the request, instructions 985 may dynamically configure the network fabric, as described in relation to instructions 285 of FIG. 2.

Instructions 930, 940, 950, 960, 970, 975, 980, and 985 may be part of an installation package that, when installed on fabric management device 902, may be executed by processing resource 910 to implement the functionalities described above. In such examples, the instructions may be stored on a portable medium, such as a CD, DVD, or flash drive, or a memory maintained by a server from which the installation package can be downloaded and installed on storage medium 920 in fabric management device 902. In other examples, instructions 930, 940, 950, 960, 970, 975, 980, and 985 may be part of an application, applications, or component(s) already installed on fabric management device 902 including processing resource 910. In such examples, the storage medium 920 may include any suitable type of memory, including a hard drive, solid state drive, or the like. In some examples, functionalities described herein in relation to FIG. 9 may be provided in combination with functionalities described herein in relation to any of FIGS. 1-8 and 10-11.

Figure 10:
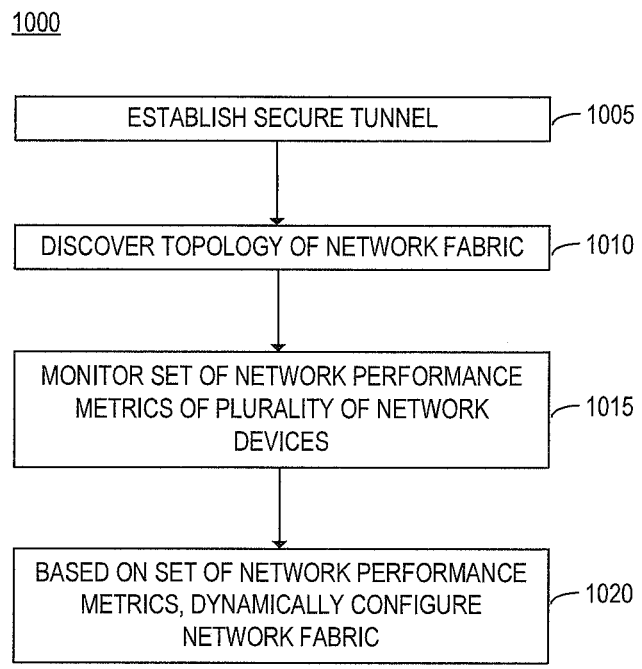
FIG. 10 is a flowchart of an example method of managing a network fabric including establishing a secure tunnel between a fabric management device and a network device across a serial interface.

FIG. 10 is a flowchart of an example method 1000 of managing a network fabric. Execution of method 1000 is described below with reference to fabric management device 200 of FIG. 2. Implementation of method 1000 is not limited to such an example however (e.g., fabric management device 100 of FIG. 1, etc.).

In the example of FIG. 10, method 1000 may be a method of device 200. At 1005, a secure tunnel may be established between fabric management device 200 and a network device of the network fabric. The secure tunnel may be established via a fabric management device driver across serial interface 205 through which fabric management device 200 connects to the network device and receives power and data. This establishment of the secure tunnel may be performed as described above in relation to instructions 230 of FIG. 2. In some examples, fabric management device 200 may use a digital certificate process such as that described in relation to instructions 231, 232, 233, and 234 of FIG. 2 to establish the secure tunnel. In other examples, fabric management device 200 may use another handshaking process to authenticate and authorize the network device and establish the secure tunnel. In some examples, the tunnel itself and/or the data carried by the tunnel may be encrypted. In other examples, encryption may not be used.

At 1010, fabric management device 200 may discover a topology of the network fabric, wherein the network fabric comprises a plurality of network devices, as described above in relation to instructions 240 of FIG. 2. At 1015, fabric management device 200 may monitor a set of network performance metrics of the plurality of network devices, as described above in relation to instructions 250 of FIG. 2. At 1020, based (at least in part) on the set of network performance metrics, fabric management device 200 may dynamically configure the network fabric, as described above in relation to instructions 260 of FIG. 2.

Although the flowchart of FIG. 10 shows a specific order of performance of certain functionalities, method 1000 may not be limited to that order. For example, the functionalities shown in succession in the flowchart may be performed in a different order, may be executed concurrently or with partial concurrence, or a combination thereof. In some examples, functionalities described herein in relation to FIG. 10 may be provided in combination with functionalities described herein in relation to any of FIGS. 1-9 and 11.

Figure 11:
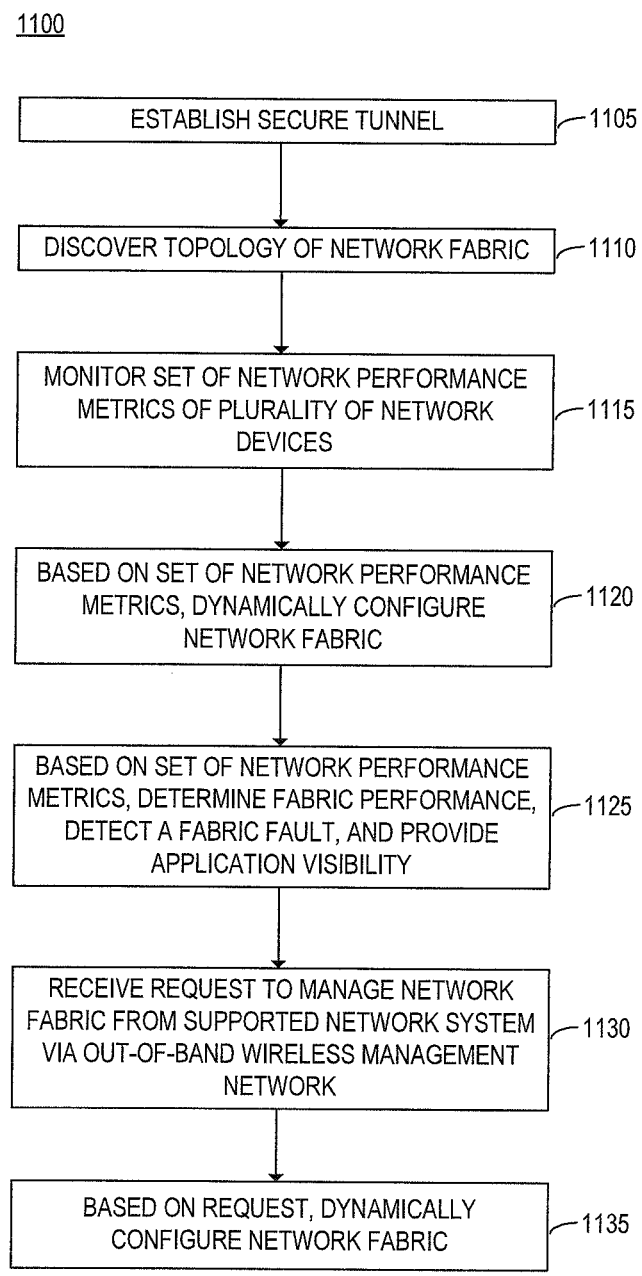
FIG. 11 is a flowchart of an example method of managing a network fabric including monitoring a set of network performance metrics and based on the network performance metrics, dynamically configuring the network fabric, determining fabric performance, detecting a fabric fault, and providing application visibility.

FIG. 11 is a flowchart of an example method 1100 of managing a network fabric. Execution of method 1100 is described below with reference to fabric management device 200 of FIG. 2. Implementation of method 1100 is not limited to such an example however (e.g., fabric management device 100 of FIG. 1, etc.).

In the example of FIG. 11, method 1100 may be a method of device 200. At 1105, a secure tunnel may be established between fabric management device 200 and a network device of the network fabric. The secure tunnel may be established via a fabric management device driver across serial interface 205 through which fabric management device 200 connects to the network device and receives power and data. This establishment of the secure tunnel may be performed as described above in relation to instructions 230 of FIG. 2. In some examples, fabric management device 200 may use a digital certificate process such as that described in relation to instructions 231, 232, 233, and 234 of FIG. 2 to establish the secure tunnel. In other examples, fabric management device 200 may use another handshaking process to authenticate and authorize the network device and establish the secure tunnel. In some examples, the tunnel itself and/or the data carried by the tunnel may be encrypted. In other examples, encryption may not be used.

At 1110, fabric management device 200 may discover a topology of the network fabric, wherein the network fabric comprises a plurality of network devices, as described above in relation to instructions 240 of FIG. 2. At 1115, fabric management device 200 may monitor a set of network performance metrics of the plurality of network devices, as described above in relation to instructions 250 of FIG. 2. At 1120, based (at least in part) on the set of network performance metrics, fabric management device 200 may dynamically configure the network fabric, as described above in relation to instructions 260 of FIG. 2. In some examples, fabric management device 200 may dynamically configure the network fabric by generating and issuing an API call to the network device. At 1125, based (at least in part) on the set of network performance metrics, fabric performance may be determined, a fabric fault may be detected, and application visibility may be provided, as described above in relation to instructions 265 of FIG. 2. In some examples, fabric management device 200 may determine fabric performance, detect a fabric fault, and provide application visibility. In other examples, further or more detailed analytics may be performed on the information gathered from the monitored set of network performance metrics at a device that is external to fabric management device 200.

At 1130, fabric management device 200 may receive a request to manage the network fabric from a network system that is supported by the network device, as described above in relation to instructions 275 and 280 of FIG. 2. The request may be received via an OOB wireless management network. In some examples, the request may be from a GUI of the network system. In other examples, the request may be from another process of the network system. At 1135, based on the request, fabric management device 200 dynamically configures the network fabric, as described above in relation to instructions 285 of FIG. 2.

Although the flowchart of FIG. 11 shows a specific order of performance of certain functionalities, method 1100 may not be limited to that order. For example, the functionalities shown in succession in the flowchart may be performed in a different order, may be executed concurrently or with partial concurrence, or a combination thereof. In some examples, functionalities described herein in relation to FIG. 11 may be provided in combination with functionalities described herein in relation to any of FIGS. 1-10.

What is claimed is:

1. A fabric management device to manage a network fabric, the fabric management device comprising:
   a processing resource including at least one processor; and
   a non-transitory machine-readable storage medium encoded with instructions executable by the processing resource, the non-transitory machine-readable storage medium comprising instructions to:
   establish secure communication with one network device of a plurality of network devices via a fabric management device driver that is installed on the one network device;
   discover a topology of the network fabric, wherein the network fabric comprises the plurality of network devices;
   monitor one or more network performance metrics of the plurality of network devices;
   based on the monitored one or more network performance metrics, detect a fabric fault of the network fabric; and
   in response to the detected fabric fault, configure the network fabric by issuing an application program interface (API) call to the one network device, wherein the API call propagates through the network fabric to at least one of remove and replace one or more of the plurality of network devices associated with the fabric fault.

2. The fabric management device of claim 1, wherein establishing secure communication with the one network device further comprises instructions to:
   present a fabric management device digital certificate to the one network device;
   receive, from the one network device, a network device digital certificate based on a verification of the fabric management device digital certificate;
   verify the network device digital certificate; and
   establish a secure tunnel between the fabric management device and the one network device.

3. The fabric management device of claim 1, wherein the non-transitory machine-readable storage medium further comprises instructions to:
   statically configure the one network device; and
   based on the monitored one or more network performance metrics, determine fabric performance and provide application visibility.

4. The fabric management device of claim 1, wherein the instructions to configure the network fabric comprises instructions to dynamically configure the network fabric.

5. The fabric management device of claim 1, wherein the non-transitory machine-readable storage medium further comprises instructions to:
   alter pathways between two or more of the plurality of network devices such that a first subset of the pathways are favored over a second subset of the pathways in response to the monitored one or more network performance metrics indicating traffic slowdown.

6. The fabric management device of claim 1, wherein the non-transitory machine-readable storage medium further comprises instructions to:
   scale the network fabric via addition of new network devices in response to the monitored one or more network performance metrics indicating that the network fabric is overloaded.

7. The fabric management device of claim 1, wherein the API call propagates through the network fabric via a clustering mechanism or protocol configured to at least one of:
   reconfigure pathways between two or more of the plurality of network devices;
   add one or more new network devices;
   remove one or more of the plurality of network devices; and
   reconfigure one or more of the plurality of network devices.

8. A non-transitory machine-readable storage medium encoded with instructions executable by a processing resource including at least one processor of a fabric management device to manage a network fabric, the non-transitory machine-readable storage medium comprising instructions to:
   establish communication between the fabric management device and one network device of a plurality of network devices via a fabric management device driver that is installed on the one network device;
   discover a topology of the network fabric, wherein the network fabric comprises the plurality of network devices;
   monitor one or more network performance metrics of the plurality of network devices;
   based on the monitored one or more network performance metrics, detect a fabric fault of the network fabric; and
   in response to the detected fabric fault, configure the network fabric by issuing an application program interface (API) call to the one network device, wherein the API call propagates through the network fabric to at least one of remove and replace one or more of the plurality of network devices associated with the fabric fault.

9. The non-transitory machine-readable storage medium of claim 8, wherein establishing secure communication with the one network device further comprises instructions to:
   present a fabric management device digital certificate to the one network device;
   receive, from the one network device, a network device digital certificate based on a verification of the fabric management device digital certificate;
   verify the network device digital certificate; and
   establish a secure tunnel between the fabric management device and the one network device.

10. The non-transitory machine-readable storage medium of claim 8, wherein the instructions comprise instructions to:
    statically configure the one network device; and
    based on the monitored one or more network performance metrics, determine fabric performance and provide application visibility.

11. The non-transitory machine-readable storage medium of claim 8, wherein the instructions to configure the network fabric comprises instructions to dynamically configure the network fabric.

12. The non-transitory machine-readable storage medium of claim 8, wherein the instructions comprise instructions to:
    alter pathways between two or more of the plurality of network devices such that a first subset of the pathways are favored over a second subset of the pathways in response to the monitored one or more network performance metrics indicating traffic slowdown.

13. The non-transitory machine-readable storage medium of claim 8, wherein the instructions comprises instructions to:
scale the network fabric via addition of new network devices in response to the monitored one or more network performance metrics indicating that the network fabric is overloaded.

14. The non-transitory machine-readable storage medium of claim 8, wherein the API call propagates through the network fabric via a clustering mechanism or protocol configured to at least one of:
reconfigure pathways between two or more of the plurality of network devices;
add one or more new network devices;
remove one or more of the plurality of network devices; and
reconfigure one or more of the plurality of network devices.

15. A method of managing a network fabric, the method comprising:
establishing a secure communication between a fabric management device and one network device of a plurality of network devices via a fabric management device driver that is installed on the one network device;
discovering, by the fabric management device, a topology of the network fabric, wherein the network fabric comprises the plurality of network devices;
monitoring, by the fabric management device, one or more network performance metrics of the plurality of network devices;
based on the monitored one or more network performance metrics, detecting, by the fabric management device, a fabric fault of the network fabric; and
in response to the detected fabric fault, configuring, by the fabric management device, the network fabric by issuing an application program interface (API) call to the one network device, wherein the API call propagates through the network fabric to at least one of remove and replace one or more of the plurality of network devices associated with the fabric fault.

16. The method of claim 15, wherein establishing secure communication with the one network device comprises:
presenting, by the fabric management device, a fabric management device digital certificate to the one network device;
receiving, from the one network device, a network device digital certificate based on a verification of the fabric management device digital certificate;
verifying, by the fabric management device, the network device digital certificate; and
establishing a secure tunnel between the fabric management device and the one network device.

17. The method of claim 15, further comprising:
altering, by the fabric management device, pathways between two or more of the plurality of network devices such that a first subset of the pathways are favored over a second subset of the pathways in response to the monitored one or more network performance metrics indicating traffic slowdown.

18. The method of claim 15, further comprising:
scaling, by the fabric management device, the network fabric via addition of new network devices in response to the monitored one or more network performance metrics indicating that the network fabric is overloaded.

* * * * *